United States Patent [19]

De' Longhi

[11] Patent Number: 5,628,125
[45] Date of Patent: May 13, 1997

[54] DEVICE FOR ELIMINATING HUMIDITY PARTICULARLY FROM LAUNDRY

[75] Inventor: Giuseppe De' Longhi, Treviso, Italy

[73] Assignee: De' Longhi S.p.A., Treviso, Italy

[21] Appl. No.: 271,015

[22] Filed: Jul. 6, 1994

[30] Foreign Application Priority Data

Jul. 30, 1993 [IT] Italy .................. MI93A1725

[51] Int. Cl.⁶ .................. F26B 21/06; F26B 3/00; F25D 17/06
[52] U.S. Cl. .................. 34/469; 62/93; 34/76; 34/475
[58] Field of Search .................. 34/73, 74, 76, 34/469, 471, 474, 475–553; 62/93, 275, 277, 291

[56] References Cited

U.S. PATENT DOCUMENTS

| | | | |
|---|---|---|---|
| 2,162,860 | 6/1939 | Philipp | 62/93 |
| 2,627,669 | 2/1953 | Candor | 34/76 |
| 2,682,758 | 7/1954 | Harris | 62/93 |
| 3,064,358 | 11/1962 | Giuffre | 62/93 |
| 3,931,683 | 1/1976 | Crites et al. | 34/73 X |
| 3,940,860 | 3/1976 | Unterreiner | 34/73 X |
| 4,250,629 | 2/1981 | Lewis | 34/77 X |
| 4,257,169 | 3/1981 | Pierce | 34/471 |
| 4,569,207 | 2/1986 | James | 62/235.1 |
| 5,149,446 | 9/1992 | Reidy | 210/744 |
| 5,276,980 | 1/1994 | Carter et al. | 34/191 |

FOREIGN PATENT DOCUMENTS

| | | | |
|---|---|---|---|
| 2220425 | 11/1973 | Germany | 34/73 |
| 3034168 | 4/1981 | Germany . | |
| 3433119 | 3/1986 | Germany . | |
| 2252401 | 8/1992 | United Kingdom . | |
| WOA9314353 | 7/1993 | WIPO . | |

OTHER PUBLICATIONS

Patent Abstracts of Japan vol. 14, No. 281 (M–0986) 18 Jun. 90 abstract of JP–A–02 085 623 (Hitachi) 27 Mar. 1990.

*Primary Examiner*—William Doerrler
*Attorney, Agent, or Firm*—Herbert Dubno; Yuri Kateshov

[57] ABSTRACT

The device for eliminating humidity particularly from laundry includes a frame body having inside, in combination, a device for dehumidifying the air and a device for heating the dehumidified air to a selected temperature.

16 Claims, 1 Drawing Sheet

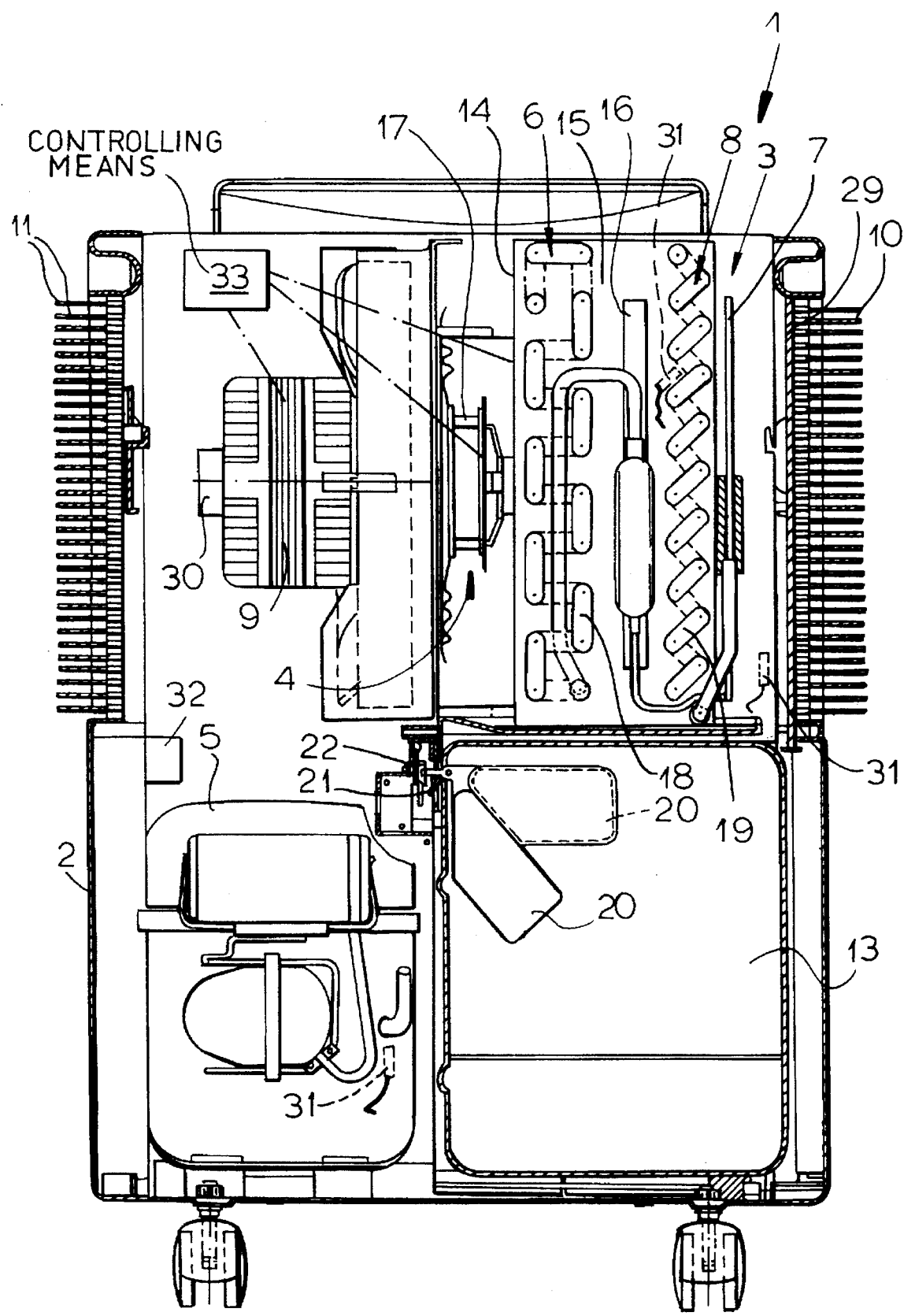

DEVICE FOR ELIMINATING HUMIDITY PARTICULARLY FROM LAUNDRY

FIELD OF THE INVENTION

The present invention relates to a device for eliminating humidity particularly from laundry.

BACKGROUND OF THE INVENTION

As known, in the last years there has been a widespread use of equipment for rapidly drying the laundry especially during the winter or in rooms and/or with no heating system and/or located in areas with a high humidity level.

This equipment usually comprises a resistance heater adapted to heat the surrounding air and a blower adapted to direct the heated air into the room where the laundry is being dried.

Such equipment often requires sliding plastic sheets covering the laundry for preventing the dispersion of heat and for concentrating the heat in the area where the drying operation must be performed.

It is easily understood that the conventional apparatus for drying the laundry increases the room temperature and causes the evaporation of the water contained in the laundry. The evaporated water is dispersed in the room increasing the humidity level of the room air.

Consequently, the laundry dries slower and the air which is again aspirated by the apparatus will eventually irreparably damage the apparatus.

OBJECTS OF THE INVENTION

It is therefore the principle object of the present invention to provide a dehumidifier eliminating the drawbacks of the prior art.

Still another object of the present invention is to provide a device for eliminating humidity, operating in rooms with a very high humidity level or in rooms with very low temperature or vice versa.

Yet a further object of the invention is to provide a device for eliminating humidity used as a dehumidifier for eliminating the humidity from the room, and/or as a laundry drier that is a thermofan and dehumidifier in order to ensure a virtually total drying of the laundry in a short time.

Still another further object of the present invention is to provide a device for eliminating humidity having small dimensions in order to be easily moved from one room to another and having a low cost.

SUMMARY OF THE INVENTION

The above mentioned objects that will are achieved by a device for eliminating humidity, particularly from a laundry room, which comprises a body having a means for dehumidifying the air and a means for heating the dehumidified air at a selected temperature.

BRIEF DESCRIPTION OF THE DRAWINGS

The above and other advantages and features of the invention will be more readily apparent from the following description illustrated, by way of example in the drawing wherein the only FIGURE is a cross-section side elevated view of the device according to the invention.

SPECIFIC DESCRIPTION

With reference to the only FIGURE, the device according to the invention, generally indicated by the reference numeral 1, comprises a body 2 housing a means for dehumidifying the air, generally indicated by 3, and a means 4 for heating the air up to a selected temperature.

In particular, the means for dehumidifying the air 3 comprises a compressor 5 adapted to compress a gas freon, which is therefore heated to a higher temperature.

The heated freon reaches at least one condenser 6 which condenses the freon. The freon cools down and releasing part of the heat to the air and becomes liquid.

After going through an expansion valve 7, the freon partially re-transforms into gas and cools down.

The cooled freon then arrives at an at least one evaporator 8 and becomes again an inert gas.

By means of at least one fan 9, air is then sucked from the room where the device is located, through a first aperture 10 on the body 2 arranged in front of the evaporator 8.

The air is expelled through a second aperture 11 on the body 2 arranged in front of the condenser 6 and ventilator 9.

In this manner, air entering the aperture 10 comes into contact with the evaporator 8. The evaporator 8 cools the air down thereby forming a condensate which is collected in a tank 13, arranged inside the body 2 below the condenser-evaporator.

The first aperture 10 comprises at least one filter 29 for preventing the deposit of dust and similar on the heater resistance.

Advantageously, the evaporator 8 is of the type having finned tubes, as the condenser 6, in order to reach rather low ambient temperatures, of about 14°–15° C., without forming ice as in the conventional dehumidifier systems.

In the conventional dehumidifier apparatus, the evaporator is formed by a coil which ices at a temperature of 16° C., 17° C. and therefore requires a deicing device.

Furthermore, the fan 9 can invert the rotation direction, by means of switching means, in order to suck air from the second aperture 11 and expel air from the first aperture 10.

In this manner, the air is heated by the condenser 6 and hits the evaporator 8 so that any frost which may have formed on the evaporator is eliminated.

The switching means comprises a switch 30 adapted to switch the rotation direction of the ventilator 9.

The switch 30 may be activated by a probe 31 or by a timer 32, or by both.

In case a probe is used, the probe may be arranged on the evaporator 8 in such a way as to detect the formation of frost on the evaporator; and/or the probe may be arranged on the inlet of the compressor in order to detect the temperature of the incoming freon; and/or the probe may be arranged at the first aperture 10 in order to detect the temperature of the incoming air.

In case a timer is used, the timer will automatically activate the switch after variable time intervals.

For example, every hour the timer stops the rotation of the ventilator, leaving the compressor work for example for one minute in order to raise the temperature of the condenser, and then the timer inverts the rotation of the ventilator in order to hit the evaporator with hot air.

In case the probe is used, it will be the probe that decides when to operate in the manner illustrated above.

As a result, the dehumidifier may work optimally, even at very low temperatures, because it can defrost the evaporator in a rapid and easy manner, eliminating the conventional expensive and complex defrosting systems, such as the freon cycle inversion, the injection of hot freon in the evaporator, and the use of resistances on the evaporator.

The condenser 6 and the evaporator 8 are rigidly connected one to another and are arranged in a container case, indicated by 14.

The case 14 comprises at least one aperture 16 on the lateral sides. The aperture 16 is adapted to provide a thermal divide 2 in order to prevent the heat from propagating from the condenser 6 to the evaporator 8. In this manner the efficiency of the dehumidifying action of the device is increased.

Clearly, besides the aperture 16, the condenser 6 and the evaporator 8 are spaced apart by a selected distance in order not to influence each other with the consequent lowering of the efficiency of the device.

Furthermore, the heating means 4 are advantageously arranged between the condenser 6 and the ventilator 9, the heating means are a resistance heater 17, adapted to heat the air coming from the first aperture 10, and which has passed the evaporator 8 and the condenser 6, in sequence.

The ventilator 9 has a rotation speed varied by controlling means 33 according to which one of the means for dehumidifying or the means for heating have been activated.

In a different embodiment, the resistance heater 17 may be arranged between the ventilator 9 and the second aperture 11.

Furthermore, at the first aperture 10, a filter 29 is arranged and is adapted to prevent the deposit of dust and similar on the resistance heater 17. Dust which could burn when the resistance is activated causing serious damage to the device.

The resistance heater 17 allows to further increase the temperature of the air, which has been already heated by going through condenser 6, and allows to further lower its humidity level in order to allow the dehumidifying of the room and/or the drying of the laundry, after the air is expelled from the ventilator 9.

Clearly, the resistance heater 17 can be activated at the same time with the dehumidifying means 3 in order to dry the laundry by raising the air temperature of the room and by simultaneously extracting the humidity delivered to the same air during the drying of the laundry.

In case only the resistance heater 17 is activated, the device operates as a traditional thermofan for heating a room.

When the resistance heater 17 is not activated, the device may operate as a conventional dehumidifier having however some added advantages with respect to the traditional dehumidifier machines.

In fact, besides the evaporator having finned tubes like the condenser, the evaporator and the condenser are rigidly connected inside a container case and kept spaced apart in order to prevent any mutual influence, thanks also to the aperture 16 that defines the thermal divide on the case 14.

This solution provides another advantage which has not yet been manifested.

Because the condenser 6 and the evaporator 8 are arranged inside the case 14, both are easily assembled in the device according to the invention. During manufacturing, it is possible to expand the tubes of the evaporator and of the condenser at the same time with one operation and it is possible to weld the curves 18 and the pins 19 simultaneously during their assembly.

It is noted that the tank 13 comprises means for signaling its condition of being filled with condensate produced by the evaporator 8.

The means are formed by a floater 20 hinged to the tank 13 and having a rod 21 adapted to operate a switch 22 for excluding the operation of the device and for signalling the full tank allowing it to be emptied.

The operation of the device according to the invention appears evident from what has been described and illustrated, namely there can be three types of operation.

In case both the resistance heater 17 and the means 3 for dehumidifying are activated, the device will operate as an effective laundry dryer, on one hand raising the room temperature for helping the drying of the laundry, and on the other hand dehumidifying the room air to which the vapor coming from the drying laundry has been released.

In this manner the drying of the laundry is optimized and all the shortcomings of the prior art have been eliminated.

The device according to the invention may also been used as a thermofan for heating an otherwise unheated room.

In this case only the resistance 17 is activated and air heated by the resistance will be delivered through the ventilator 9 from the second aperture 11.

The third type of operation of the device according to the invention is that of air dehumidifier.

In this case the dehumidifying means 3 are activated while the resistance 17 is instead deactivated.

The dehumidifying means 3, as already said, will dehumidify the room air with a high efficiency of the device thanks to the above described features.

It has been seen in practice that the device for eliminating humidity particularly from laundry, according to the invention, is particularly advantageous because is particularly flexible and at the same time has a high efficiency at very low costs.

The device according to the invention may have numerous modifications and variations, all within the inventive concept; furthermore, all the details may be substituted with technically equivalent elements.

The materials employed, as well as the dimensions, may be any according to the specific needs and the state of the art.

Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

I claim:

1. A heating and dehumidifying assembly comprising:
    a housing;
    dehumidifying means in said housing for drying the room air entering said housing along a path and comprising:
        compressor means for compressing a gas, and
        condensing means along said path and including a first plurality of finned tubes traversed by the gas for transforming said gas received from said compressor means into a liquid phase upon releasing part of the heat,
        expansion valve means for retransforming the liquid phase into a gaseous phase of said gas,
        evaporating means along said path receiving the gas from the valve means and including a second plurality of finned tubes traversed by the gas for heating said gas to form a condensate, and
        reservoir means operatively connected with said evaporating means for collecting said condensate;
    a casing in said housing and along said path housing said condensing and evaporating means, said first and second plurality of finned tubes being spaced apart at a predetermined distance and being rigidly connected with one another to allow simultaneous expanding and welding of said tubes of first and second plurality in said casing; and heating means in said housing along said path for heating the air in said housing.

2. The assembly defined in claim 1 wherein said casing is formed with at least one aperture for preventing heat transfer from said condensing means to said evaporating means.

3. The assembly defined in claim 1, further comprising fan means for directing a flow of the room air along said path.

4. The assembly defined in claim 3 wherein the fan means is provided with switching means for reversing the direction of the flow of the air along said path.

5. A heating and dehumidifying assembly comprising:

a housing formed with front and rear sides;

means forming a respective opening on each of said front and rear sides, said openings defining an air path therebetween;

fan means for directing a flow of the room air to be dehumidified along said air path, a casing in said housing along said air path and formed with at least one aperture;

dehumidifying means in said housing for drying the room air entering said housing and comprising:
compressor means for compressing a gas,
condensing means in said casing for cooling said gas received from said compressor means, the gas releasing part of the heat to warm the room air in said housing trough said aperture upon transforming into a liquid phase in said condensing means,
expansion valve means for retransforming the liquid phase of said gas into the gaseous phase,
evaporating means in said casing and receiving said gas from said valve means for heating said gas to form a condensate, and
reservoir means operatively connected with said evaporating means for collecting said condensate, said condensing and evaporating means being spaced apart and being rigidly connected with one another in said casing, said aperture preventing heat transfer from said condensing means to said evaporating means;

heating means along said path in said housing for heating said room air; and switching means for monitoring said fan means to controllably alternate direction of the flow of the room air along said air path for defrosting said evaporating means.

6. The assembly defining in claim 5 wherein said switching means includes:

a probe detecting a predetermined temperature of an incoming gas or incoming air or the formation of frost on the evaporating means and generating a signal; and a switch receiving said signal and changing a direction of rotation of said fan means in response to said signal.

7. The assembly defining in claim 5 wherein said switching means includes a timer generating a signal at a predetermined intervals and a switch receiving said signal to reverse a direction of rotation of said fan means.

8. The assembly defined in claim 5 wherein said expansion valve is located in said housing.

9. The assembly defined in claim 5 wherein said heating means is located between said fan and said dehumidifying means.

10. The assembly defined in claim 8 wherein said heating means includes a resistance heater.

11. The assembly defined in claim 5 wherein said heating means is activated simultaneously with said dehumidifying means.

12. The assembly defined in claim 5 wherein said heating means is activated separately from said dehumidifying means.

13. The assembly defined in claim 5 wherein said reservoir means is provided with a tank accumulating condensate and sensor means for detecting a level of said condensate.

14. The assembly defined in clam 12 wherein said sensor means includes a floater provided with a rod and a sensor connected with said rod and signalling a full state of said tank.

15. The assembly defined in clam 5 wherein at least one of said openings is provided with filtering means for preventing deposit of dust on said expansion valve.

16. A heating and dehumidifying assembly comprising:

a housing;

fan means in said housing for directing a flow of the room air to be dehumidified along an air path in said housing;

dehumidifying means in said housing for drying the room air and comprising:
compressor means for compressing a gas,
condensing means along said path and including a first plurality of finned tubes traversed by the gas for transforming said gas received from said compressor means into a liquid phase upon releasing part of the heat,
expansion valve means for retransforming the liquid phase into a gaseous phase of said gas,
evaporating means along said path receiving the gas from the valve means and including a second plurality of finned tubes traversed by the gas for heating said gas to form a condensate, and
reservoir means operatively connected with said evaporating means for collecting said condensate;

a casing in said housing and along said path housing said condensing and evaporating means, said first and second plurality of finned tubes being spaced apart and being rigidly connected with one another;

heating means in said housing along said path for heating the air in said housing; and means for varying a rotation speed of said fan means, said rotation speed being varied according to which of said heating means or said dehumidifying means has been activated.

* * * * *